United States Patent [19]

Gregg

[11] 4,022,549

[45] May 10, 1977

[54] SHORELINE AIR COMPRESSORS WHEREIN SWELL WATER PUMPS THE AIR

[76] Inventor: Harold Gregg, Petaluma, Calif.

[22] Filed: Apr. 30, 1976

[21] Appl. No.: 681,921

Related U.S. Application Data

[63] Continuation-in-part of Ser. No. 600,317, July 30, 1975, abandoned.

[52] U.S. Cl. .............................. 417/100; 417/330; 60/398
[51] Int. Cl.² ...................................... F04F 11/00
[58] Field of Search .......... 417/100, 330, 334, 240, 417/241; 60/398; 290/53

[56] References Cited

UNITED STATES PATENTS

| 430,790 | 6/1890 | Starkenberg | 417/240 |
|---|---|---|---|
| 610,790 | 9/1899 | Becker | 417/100 |
| 875,042 | 12/1907 | Bissell | 417/100 |
| 960,478 | 6/1910 | Allard | 417/100 |
| 1,175,287 | 3/1916 | Olmsted | 417/330 |
| 1,331,209 | 2/1920 | Philips | 417/100 |

Primary Examiner—John J. Vrablik
Assistant Examiner—Thomas I. Ross
Attorney, Agent, or Firm—George B. White

[57] ABSTRACT

A rigid waterproof structure built on the ocean floor near a shore is completely enclosed. Guides are provided to direct the waves or swells from the ocean to an inlet opening which is completely covered, by a free-hanging heavy gate which latter is opened when the waves or swells move toward the shore thereby introducing water into the dome-like structure and displacing the air therein, thus compressing it. The air is forced out through check valves and thus compressed is conducted to a storage tank for the compressed air. Air intakes are provided which are closed when the air is compressed in the structure and are opened when the water escapes from the structure. As the waves are receding from the shore the free-hanging gate is drawn over the inlet opening and closes the same, and a device, in this form cables over pulleys connected to the free-hanging gate and to gates covering respective outlets, pulls the gates open thereby letting the water escape from the structure behind and outside the guide walls instead of the same way it entered and thereby not interfering with the next incoming swell or wave.

8 Claims, 3 Drawing Figures

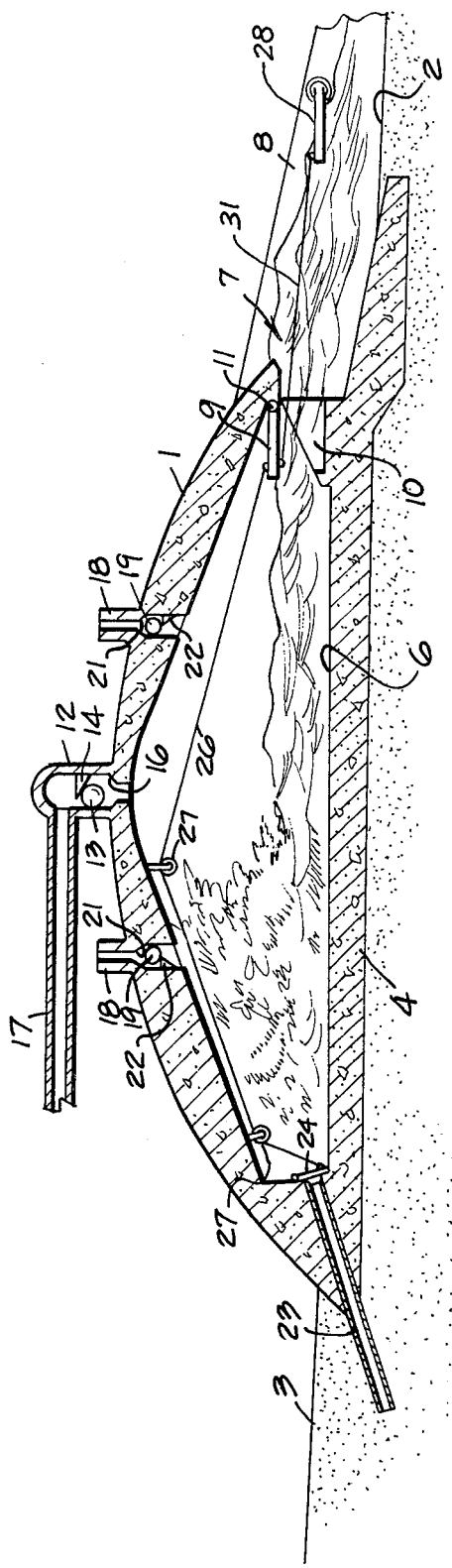
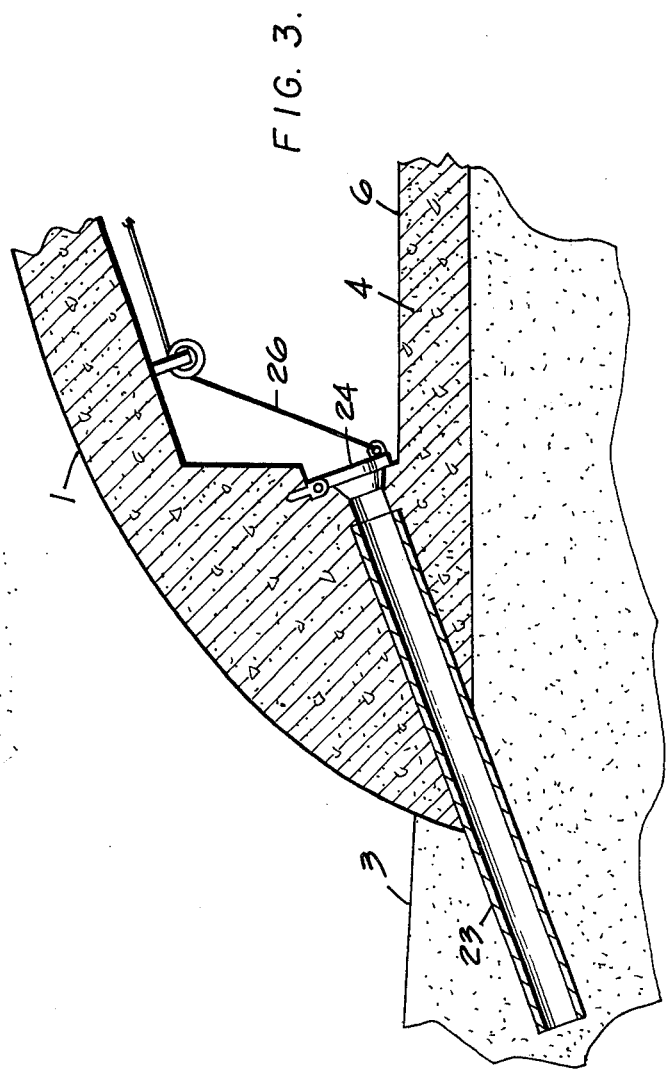
FIG. 2.
FIG. 3.

SHORELINE AIR COMPRESSORS WHEREIN SWELL WATER PUMPS THE AIR

This is a continuation in part, of application Ser. No. 600,317 filed July 30, 1975, now abandoned.

BACKGROUND OF THE INVENTION

Prior attempts to utilize waves or swells are illustrated by the following prior patents of which applicant is aware: U.S. Pat. No. 576,920 granted to Toennes in 1897; No. 603,314 granted to Brown in 1898; No. 610,790 granted to Beckers in 1898; No. 875,042 granted to Bissell in 1907; No. 1,008,683 granted to Wall in 1911; No. 1,331,209 granted to Phillips in 1920, No. 1,366,002 granted to Hutchinson in 1921.

Applicant's object is to provide a more simple yet sturdy structure which can be constructed near the shore permanently resting on the bottom ground, and guides for the waves or swells exposed toward the open water, and a device inside of this permanent dome whereby the swells are utilized inside of the dome for opening and closing respective devices for the introduction and discharge of the water.

In general the object of the invention is to provide a simple solid structure with a minimum of movable parts which can be easily actuated by the swells or waves.

BRIEF DESCRIPTION OF THE DRAWINGS

FIG. 2 is a cross-sectional view of the structure.

FIG. 3 is a fragmental view showing a gate on one of the water outlets of the structure.

DETAILED DESCRIPTION

Figure 1:
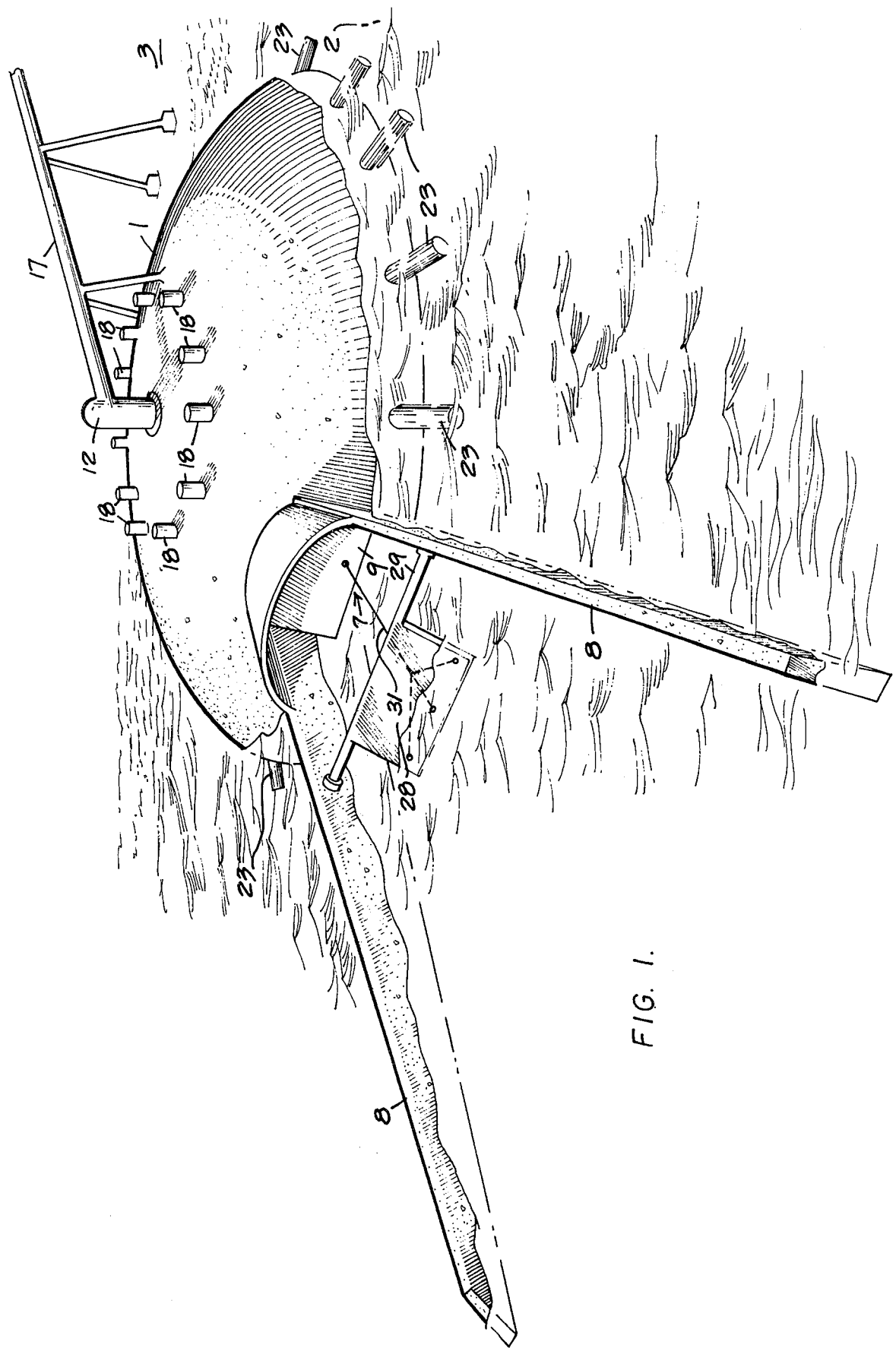
FIG. 1 is a perspective view of the structure.

The dome structure 1 is built preferably of reinforced concrete structure which can be deposited on the ocean floor 2 near the shore 3. To assure complete sealing the structure includes a base 4 the inner bottom face 6 of which is level as shown in FIG. 2. On the side of the dome facing the water is an inlet opening 7. A pair of guide walls 8 extend from the inlet opening 7 diverging toward the open water and away from the shore to guide the waves or swells to the opening 7. The guide walls 8 are highest at the dome 1. The guide walls 8 also are preferably of reinforced concrete and rest upon the ocean floor, and diverge to a distance substantially equal to the diameter of the base of the dome 1. On the inlet opening 7 and inside the dome structure 1 is a heavy gate 9 supported on firm hinges 11 so that the gate hangs freely to open and close the opening 7. The gate 9 only opens when lifted by the water moving toward the shore 3 and closes when the water recedes. The tops of side walls 10 at the inside of the inlet opening 7 are inclined downwardly and inwardly toward the shore 3 to support the gate 9 in closing position.

On the highest point of the dome 1 is an outwardly one-way outlet device 12 which for simplicity herein is illustrated by a ball-check valve 13. This check valve 13 is open and pressed against a stop 14 when the swells enter into the cavity of the dome by the trapped air therein, because the trapped compressed air lifts the ball 13 from its seal 16. The trapped air is conducted through a conduit 17 to a suitable compressed air storage not shown. When the water recedes the compressed air closes the ball check-valve 13.

To admit atmospheric air into the dome when the water recedes, a plurality of one-way intake valves 18 are provided which again for simplicity are illustrated as ball check-valves including a ball 19 which seats on a seat 21 as shown in FIG. 2. The receding water creates a partial vacuum opening the intake valves 18 by dropping the balls 19 on the internal stops 22 to admit air for expelling the water.

A plurality of water outlets 23 are peripherally spaced around the dome and extend below the water line a short distance from the dome for the escape of water from the dome 1. The inner ends of the water outlets 23 are sealed by free-hanging gates 24. Each free-hanging gate 24 has a cable 26 connected thereto which is played over suitable guides such as pulleys 27. The cables 26 are connected to the free hanging inlet gate 9 in such a manner that when the inlet gate 9 is swung open by the entering swell the outlet gates 24 are allowed to close the outlets 23 and when the inlet gate 9 is closed by the pull of the receding waves it pulls the outlet gates 24 open for the outflow of the water from the dome.

An auxiliary panel 28 is swingably suspended from a pivot shaft 29 extended between and supported on the guide walls 8 and spaced from the inlet 7.

The auxiliary panel 28 is an assist panel, and it is connected by a cable connection 31 to the inlet gate 9 in such a manner that as the water recedes it will exert a pull on the inlet gate 9 thereby to assist in opening the outlet gates 24.

The guide walls 8 extend to a distance sufficient to space apart the outer ends thereof to a distance substantially equal to the diameter of the base of the dome. Thus as the guide walls 8 converge the water flowing therein toward the dome becomes deeper and also accelerates so that the weight and speed of the water will be capable to lift the inlet gate 9 and also to rapidly fill the dome.

The area of the opening at the inlet gate 9 is equal to the total area of the openings of all the outlets 23 at the outlet gates 24. The weight of the inlet gate 9 is greater than the total weight of all of the outlet gates 24. This enables the closing of the inlet gate 9 to exert sufficient force to open all the outlet gates 24, as the water recedes outward between the guide walls 8. There exists no static condition. The purpose of the outlet gates 24 is to discharge the water outside of the guide walls 8 thereby not to interfere with the next wave entering. The size of the dome determines the size of the inlet gate 9 and the outlet gates 24 in order to allow the amount of water which entered during the previous wave to be discharged before the cycle is repeated. Thus the inlet gate 9 controls the closing and opening of the outlet gates 24. When the force of the water lifting the inlet gate 9 decreases, the inlet gate being heavier than the total weight of the outlet gates 24 is lowered, pulling the outlet gates 24 into open position whereby the water is discharged from the dome outside of the area determined between the guide walls 8.

I claim:

1. A swell water utilizing structure comprising
a dome on the sea bottom near the shore
an inlet to the interior of said dome facing away from the shore,
a pair of guide walls extended toward the open water and diverging away from said inlet to guide the swells toward said inlet,
and covering means for said inlet being openable by the swell water toward the shore for compressing air in the dome and being closed by the receding of the swell water away from the shore, one way outlet means for discharging the swell water from said dome, means to co-ordinate the opening of said inlet covering means and of said outlet means so that the closing of said inlet covering means opens said outlet means, outwardly one-way conducting means on the dome for conducting the air compressed by the swell water in said dome away from said dome, said one-way conducting means being closed by the suction created by the receding of the swell water from said dome, and a plurality of inwardly one-way check devices openable by the swell waters receding from said structure to admit atmospheric air, said check devices being adapted to be closed by the compression of the air when the swell water enters into said dome.

2. The invention specified in claim 1, and said outlet means including, a plurality of water outlets around the portion of said dome near the base thereof, and outlet closing means to close each of said outlets when the swell water enters the dome and to open said outlets for discharging water from the dome during the receding of the swells.

3. The invention specified in claim 2 and said means to co-ordinate the operation of said outlet closing means with the opening and closing of said covering means including inlet and outlet gates connected together for operating oppositely to one another.

4. The invention specified in claim 2, and said covering means being a freely hanging inlet gate inside the dome fitting over said inlet.

5. The invention specified in claim 4, and said outlet closing means being freely hanging outlet gates inside the dome fitting over said water outlets, and said co-ordinating means being connections between said inlet gate and each of said outlet gates lifting said outlet gates when said inlet gate drops to closing position and allowing said outlet gates to close when the inlet gate is lifted to open position.

6. The invention specified in claim 3, and said outlets extending outwardly from the dome below the water level.

7. The invention specified in claim 3, and the distance between the free ends of said guide walls being at least equal to the width of the base of the dome.

8. The invention specified in claim 4, and said guide walls being tapered so that their portions near said dome are above the water level, and a swingable panel between guide walls spaced from said inlet connected to said inlet gate so as to exert a pull on said inlet gate toward closing position when the swell water recedes.

* * * * *